United States Patent
Wang

(10) Patent No.: US 7,779,167 B2
(45) Date of Patent: Aug. 17, 2010

(54) UNIVERSAL INTEGRATION SYSTEM FOR AUXILIARY DIGITAL AUDIO PLAYBACK

(75) Inventor: Ting Z. Wang, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 206 days.

(21) Appl. No.: 11/528,866

(22) Filed: Sep. 28, 2006

(65) Prior Publication Data

US 2008/0154400 A1      Jun. 26, 2008

(51) Int. Cl.
*G06F 3/00* (2006.01)
*G06F 13/12* (2006.01)
*G06F 13/38* (2006.01)

(52) U.S. Cl. .............................. 710/8; 710/10; 710/11; 710/64

(58) Field of Classification Search ........... 710/8, 710/10, 11, 64
See application file for complete search history.

(56) References Cited

U.S. PATENT DOCUMENTS

| 5,974,238 | A | * | 10/1999 | Chase, Jr. ............ 709/248 |
| 6,560,665 | B1 | * | 5/2003 | Resler et al. ........... 710/305 |
| 2001/0033225 | A1 | | 10/2001 | Razavi et al. |
| 2005/0281414 | A1 | * | 12/2005 | Simon et al. ........... 381/86 |
| 2007/0233294 | A1 | * | 10/2007 | Holden et al. .......... 700/94 |

FOREIGN PATENT DOCUMENTS

| DE | 10357031 | 6/2005 |
| EP | 0950570 | 10/1999 |
| EP | 1282238 | 2/2003 |

\* cited by examiner

*Primary Examiner*—Niketa I Patel
*Assistant Examiner*—Zachary K Huson
(74) *Attorney, Agent, or Firm*—Jimmy L. Funke

(57) ABSTRACT

A vehicle audio system 30 reconfigures with a PDAD 32 device by sending a series of queries through a supported channel, preferably a UART channel to the PDAD with the PDAD sending back requested control information 42 and meta-data housing information 46.

13 Claims, 2 Drawing Sheets

UNIVERSAL INTEGRATION SYSTEM FOR AUXILIARY DIGITAL AUDIO PLAYBACK

TECHNICAL FIELD

The field of this invention relates to in-vehicle integration of auxiliary digital audio systems.

BACKGROUND OF THE DISCLOSURE

Personal digital audio devices, often referred to as portable digital audio devices, MP3 players, or the acronym PDADs have seen wide spread acceptance as an alternative way to store ones musical library. Several advantages over cassette tapes and compact discs are apparent. Firstly, the single device can house the equivalent of stacks of compact discs and cassette tapes in a portable and very handy package. Secondly, the digital quality is superior to most analog tapes. Thirdly, where analog tapes may degrade over time and CDs may become scratched to the point where the playback of the music becomes interrupted, the PDAD loaded music is immune to scratching and other degradation. In addition, the speed which one may change albums and the selection of songs is vastly faster than the changing CDs or cassette tapes.

On the other hand, motor vehicles have long integrated features to universally play cassette tapes and compact discs on the motor vehicle audio stereo system. The vehicular audio system can often display certain information such as track number or title of song which is read from the cassette tape or CD itself. To date, no vehicle audio system can universally play any PDAD without the addition of an intervening box. Up till now, universal PDAD plug-ins to the motor vehicle have been limited to an input jack which merely provides audio sound to the vehicle audio stereo system but provides no control as to play, fast forward, rewind, next song or other control features commonly found on vehicular audio systems for CDs and also found on PDADs. The vehicle audio system also provides no display or search features of the genre, composer, artist or song title commonly found on many PDADs.

However, consumers desire that their PDAD regardless of particular type or brand can digitally be plugged into a vehicle audio system such that the audio system can read and display meta-data and incorporate browsing features which are available on the PDAD itself. Up till now, a direct integration is available which lacks universality. The vehicle audio system is capable of controlling a specific brand or type of personal digital audio player. Furthermore, integrated audio playback usually doesn't support rich-featured browsing and meta-data display.

Another method is indirect integration which has required a separate box running an advanced operating system and equipped with a universal plug and play (UPnP) interface i.e. USB port. The separate box adds extra cost in both hardware and software.

What is needed is a low-cost integration system for integrating a wide range of PDAD brands into a motor vehicle audio system that provides digital display and browsing features of a wide range of PDAD brands.

SUMMARY OF INVENTION

In accordance with one aspect of the invention, a system for integrating a personal digital audio device to an audio system having a display and control buttons. The audio system and the personal digital audio device are connected together through a communication channel preferably supported by an universal asynchronous receiver transmitter (UART) at both the audio system and the personal digital audio device. An audio path is also operable between the personal digital audio device and the audio system.

The personal digital audio device sends a device identification packet through the communication channel to the audio system. The audio system sends back an acknowledgement receiving the device identification and sending supported baud rates along the communication channel to the personal digital audio device. The personal digital audio device sends an acknowledgement of receiving the supported baud rates and confirms a top supported baud rate. The audio system sending acknowledgement of receiving confirmation along with playback control query. The personal digital audio device sends acknowledgement of receipt of playback control query along with playback control codes for requested commands. The audio system sends an acknowledgement of receiving the playback control codes and sends a meta-data browsing query. The personal digital audio device sends an acknowledgement of receiving the meta-data browsing query along with meta-data in-state browsing codes. The audio system sends an acknowledgement of receiving the meta-data browsing codes and sends a reconfiguration notification to the personal digital audio device. The audio system and the personal digital audio device both reconfigure to send on the supported communication channel to provide communication to each other and the personal digital audio system awaits a command from the audio system.

Preferably, the audio system is a vehicular audio system. The playback codes preferably, include, play, stop, pause, fast forward, fast reverse, previous and next commands. The meta-data browsing codes in one embodiment include select and back between two states and next and previous for in-state browsing.

In accordance with another aspect of the invention, a system integrates a personal digital audio device to a vehicular audio system having its own display and control buttons. The personal digital audio device and the vehicular audio system having a communication channel therebetween preferably supported by UART. The personal digital audio device and the vehicular audio system have an audio channel connected therebetween. The personal digital audio device sends a series of information packets to the vehicular audio system including device identification, confirmation of supported baud rates, playback control code information and meta-data browsing code information. The vehicular audio system sends a series of information packets to the personal digital audio device including, supported baud rates, playback control queries, meta-data browsing queries and a configuration notice. The personal digital audio device and the vehicular audio system each reconfigure to provide communication to the other through the supported communication channel.

BRIEF DESCRIPTION OF THE DRAWINGS

Reference now is made to the accompanying drawings in which.

DETAILED DESCRIPTION OF THE PREFERRED EMBODIMENT

Figure 2:
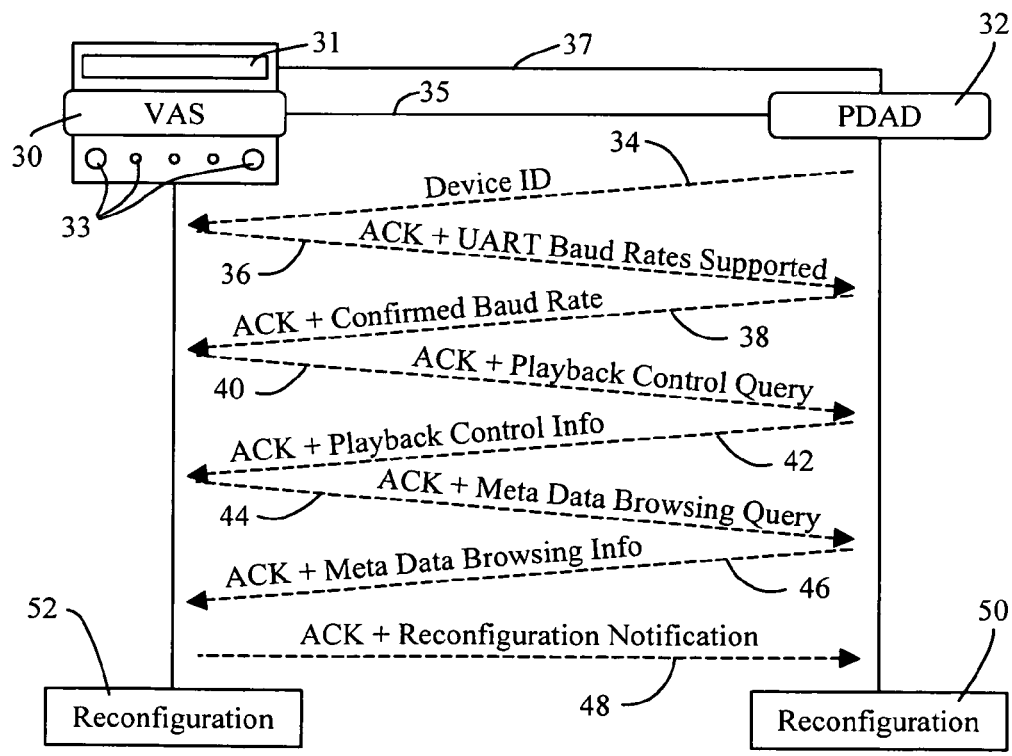
FIG. 2 is a schematic illustrating a synchronization process of a PDAD with a vehicle audio system (VAS) along the communication channel to provide control of the PDAD through the VAS.

Vehicular audio systems (VAS) 30 as labeled in FIG. 2 now commonly have display panels 31 and control buttons 33 that may have multi-functions depending on the mode that it is in. The term "control buttons" is used in a generic sense and may look like keys, levers, slides, knobs, switches etc. In order for the control buttons to work and control any PDAD, the vehicular audio system and the PDAD must reconfigure to be able to communicate to each other. In order to control any PDAD that is plugged into the vehicle audio system, the vehicle audio system must reconfigure its software each time a new PDAD device is plugged in.

In order to do this two interactive paths are set up. The communication channel 35 which exchanges the control information and browsing data as necessary and the audio path. The audio path 37 may be an auxiliary audio channel or the headphone jack in the vehicular system plugged into the output audio jack in the PDAD.

The communications channel allows the control buttons to control the PDAD and for the display panel to show the information that is commonly displayed on the PDAD panel itself. The vehicular audio system may be equipped with UART or CAN (Controller Area Network). The PDAD is usually capable with UART, USB and or Firewire. As a low cost method, UART is the preferred communications channel to exchange the control information and meta data.

As shown in FIG. 2, the Vehicle Audio System (VAS) 30 reserves a play channel and listens on the appropriate UART channel at the common low baud rate, for example 9600 bps; for the availability of this playback. Once the PDAD 32 is available and on, the PDAD will send the Device ID packet to notify the VAS 30 at 34 of its existence and what type of PDAD it is. This initial handshaking packet comes with a sequence number and starts the synchronization and information exchange session.

The sequential packet will always acknowledge (ACK) the immediate previous packet. After the Device ID is acknowledge, the VAS 30 will confirm the UART baud rate at 36 which will be used after reconfiguration. The PDAD will acknowledge the request and confirm its supported baud rate at 38. This step may be done incrementally with the vehicular audio system sending the lowest rate, waiting for a positive response, incrementally increasing its baud rate, receiving acknowledgement of support of the increased rate until the highest commonly supported baud rate is reached.

The vehicle audio system then acknowledges the highest common baud rate and sends out a query packet for playback control commands at 40. The playback control query will ask for commands for example Play, Stop, Pause, Fast Forward, Fast Reverse, Previous, or Next. PDADs have common play controls such as PLAY, STOP, FAST FORWARD, FAST REVERSE, PREVIOUS and NEXT.

The PDAD in response acknowledges the query and replies to the corresponding command code for each individual command requested at 42. If the replied command length is 0, it means that this command is not supported by the PDAD.

The vehicular audio system then acknowledges receiving the commands and sends a meta data browsing query at 44 which basically asks the PDAD how to browse its meta data. For the meta-data browsing walk it is helpful to look at a typical prior art PDAD meta data browsing system illustrated in FIG. 1.

Figure 1:
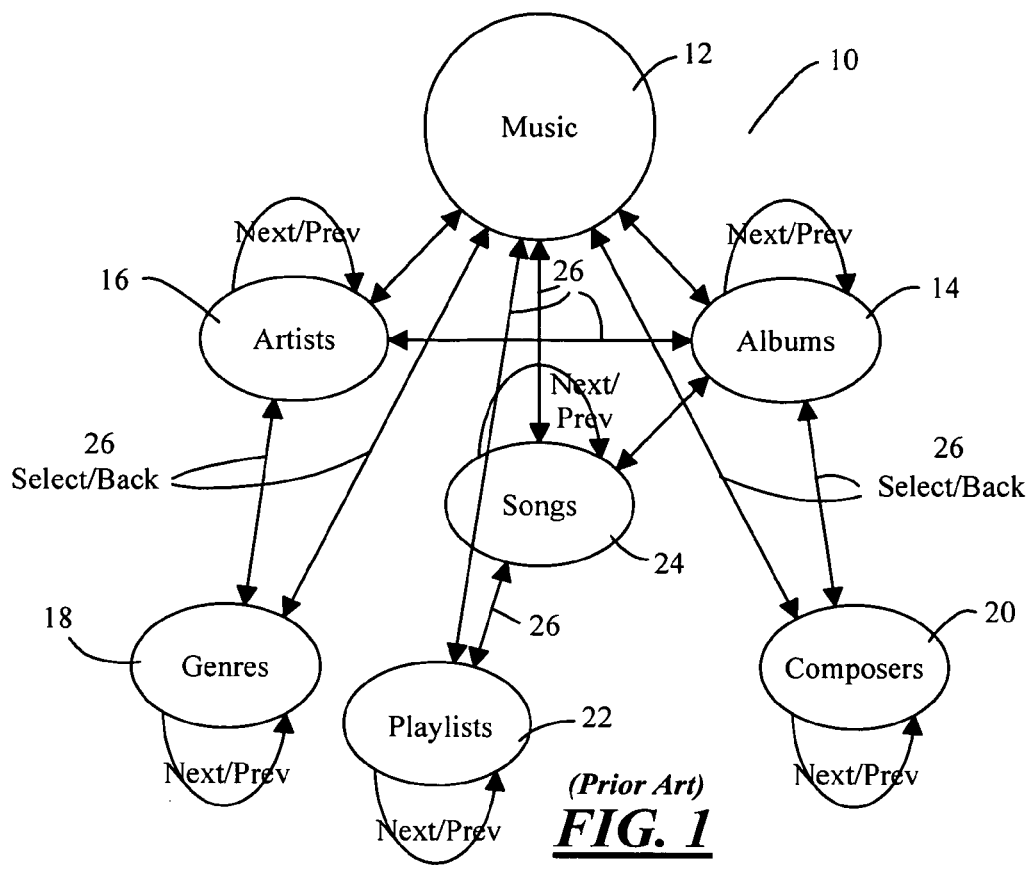
FIG. 1 is a schematic flow chart illustrating typical meta-data browsing path of a PDAD.

Referring now to FIG. 1, a typical PDAD for example the Nano iPod™ provides control through a series of menus. For example the music menu 10 shown in FIG. 1, provides a walk among several elementary states within the Music program 12, namely Albums 14, Artists 16, Genres 18, Composers 20, Playlists 22 and Songs 24. Songs 24 is the only leaf state which means one can reach Songs 24 by browsing through any of the elementary states 12-22. In the Songs 24 state, a particular son i.e. title may be selected to be played.

Walking between the various states is achieved by using the SELECT/BACK command can be reversed with memory intact. The various SELECT BACK paths 26 are shown between the various states 12-24. For example, if one goes to Songs 24, one can then reverse to the previous state. If that was MUSIC 12, selecting back from Songs 24 then goes back to Music 12. If the previous states were Music 12 and Albums 14, going back will go back to Albums 14, and then to Music 12. If the selected path was Music 12, and Composers 20 to Songs 24, then when one reverses from Songs 24, one will back to Composers 20 before going back to Music 12. If the path was Music 12, Playlists 22 and then Songs 24, one will go back to Playlists 22 and then Music 12. If one chooses the path Music 12, Artists 16, Albums 14 and Songs 24, one will go back to Albums 14, then Artists 16 then Music 12. If one selected the path Music 12, Genres 18, Artists 16, Albums 14 and Songs 24, the path will go from Songs to Albums 14, Artists 16, Genres 18 and Music 12.

Within each state, the PDAD may be controlled by a PREVIOUS/NEXT command. The Previous/Next Command for example can choose one of a desired variety of Genres for example, Jazz, Rock, Classical, or Popular music. The genres may be individually tailored as one loads the music to the PDAD. Similarly, the various Artists, are loaded as the Songs are loaded onto the PDAD. The Albums on which the Song is located is also loaded and displayed in the Album state 14. One can personally choose songs on various designed playlists 22, for example "Drive to Work" songs, "Relaxing" songs, "sleep time" songs, "dancing" songs etc. One can also go to composers who wrote the various songs in the Composer state 20.

The vehicle audio system needs to know only the following information from the PDAD: the Previous/Next command, the Select/Back command, how to achieve each elementary state 12-24 and the walk path starting from each state 12-22 to the leaf state 24 i.e. Songs 24. The PDAD acknowledges the Meta data browsing query and provides the corresponding command code for each meta data command at 46.

After the exchange of information, the vehicle audio system is able to reconfigure the playback source based on the information from the PDAD and will send out acknowledgement of the receipt of the meta data browsing info and sends a reconfiguration notification to the PDAD at 48 and close the current communication session.

At this time, the PDAD should reconfigure its UART channel at the negotiated baud rate and wait for a command from the vehicle audio system at 50. The vehicle audio system will also reconfigured at 52 and provide the proper function for its control buttons and provide the proper display information on its display screen.

Figure 3:
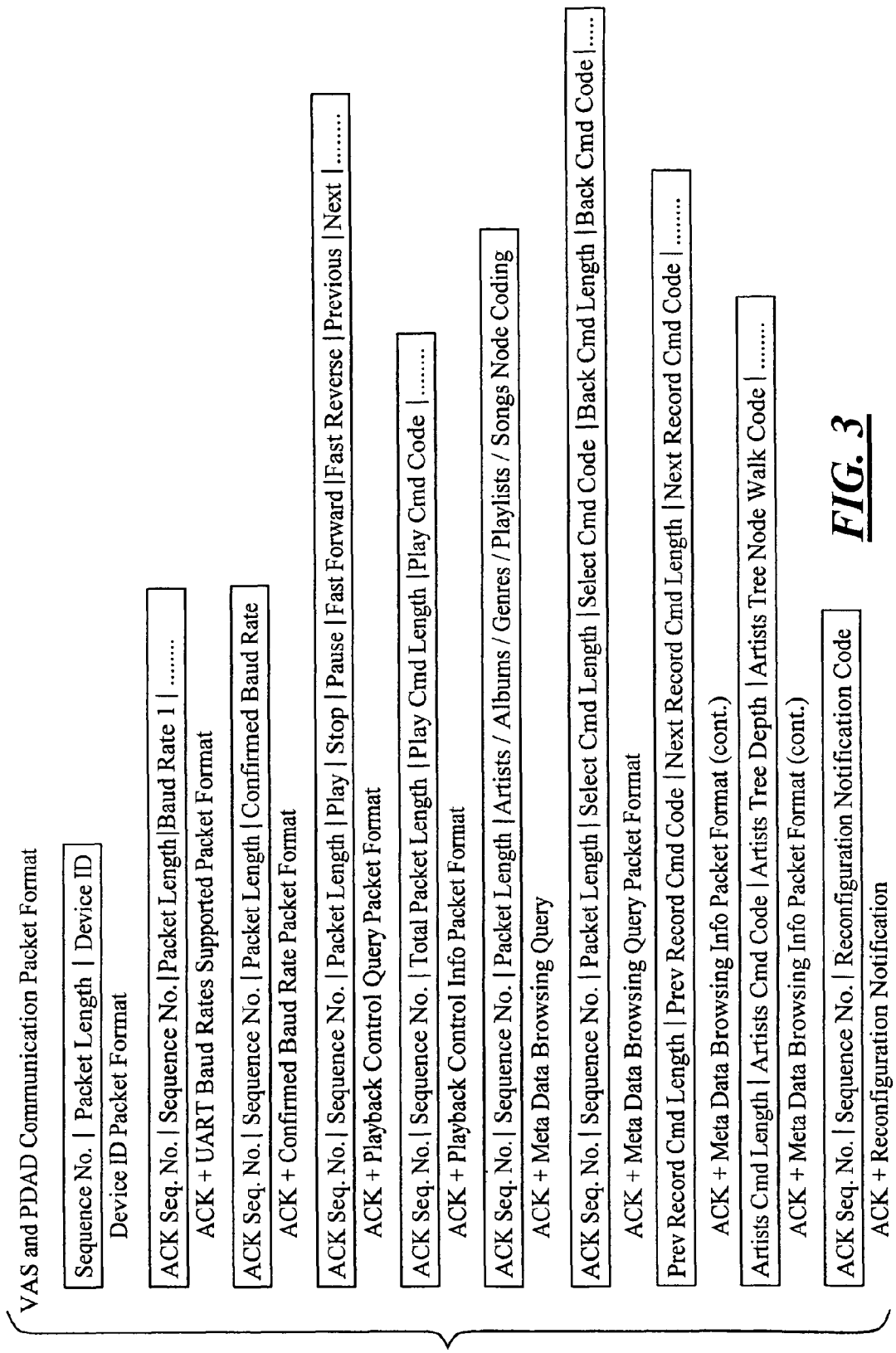
FIG. 3 is VAS and PDAD communication packet format chart.

Referring now to FIG. 3, the method steps shown in FIG. 2 are displayed in chart form with the packets listed in more detail. For example the Device ID has a sequence no, packet length and the Device ID. The Baud Rates Supported packet includes the ACK sequence number, its own Sequence Number and it packet length and at least one baud rate that it can support. The PDAD Confirmed baud rate packet contains the ACK Sequence Number, its own sequence number, its packet length and the confirmed baud rate.

The Playback control query contains its ACK sequence number, its own sequence number, its own packet length, play, stop, pause, fast forward, fast reverse, previous, and next commands.

The Playback Control Info packet format from the PDAD includes an ACK sequence number, its own sequence number, its total packet length, the play command code length, play command code, the stop command length, the stop command code, the pause command code length, the pause command the command code length and command code for the other commands.

The Meta Data Browsing query 44 includes the ACK sequence number, its own sequence number its packet length and requests for Artists, albums genres, playlists, songs node coding et.

The Meta Data Browsing query packet format from the PDAD includes the ACK sequence number, its own sequence number, its packet length, the command length, and command code for all the requested commands for Select, back, previous, next, artists, etc.

The vehicle audio system then sends out the reconfiguration notification code along with the ACK sequence number from the previous reception of the previous packet.

In his fashion the use of an inexpensive chip such as a UART chip within the PDAD and the vehicle audio system provides the ability of any PDAD to be plugged into the vehicle audio system and control of the PDAD provided through the control buttons of the radio and see the PDAD information on the display of the vehicle audio system.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

I claim:

1. A system for integrating a personal digital audio device to an audio system said audio system and personal digital audio device connected together through a communication channel without an interface unit therebetween; an audio path between the personal digital audio device and audio system; said system comprising:

said personal digital audio device sending a device identification packet through the communication channel to said audio system;

said audio system sending back an acknowledgement receiving said device identification and sending supported baud rates along said communication channel to said personal digital audio device;

said personal digital audio device sending an acknowledgement of receiving supported baud rates and confirming a top supported baud rate;

said audio system sending acknowledgement of receiving confirmation along with playback control query;

said personal digital audio device sending acknowledgement of receipt of playback control query along with playback control codes for requested commands;

said audio system sending an acknowledgement of receiving said playback control codes and sending a meta-data browsing query;

said personal digital audio device sending an acknowledgement of receiving said meta-data browsing query along with meta-data in-state browsing codes;

said audio system sending an acknowledgement of receiving said meta-data browsing codes and sending reconfiguration notification to said personal digital audio device;

said audio system and said personal digital audio device reconfigure to operable communication along the communication channel; and said personal digital audio device awaits a command from said audio system.

2. A system as defined in claim 1 wherein said audio system is a vehicular audio system.

3. A system as defined in claim 2 wherein said playback codes include, play, stop, pause, fast forward, fast reverse, previous and next commands.

4. A system as defined in claim 3 wherein said meta-data browsing codes include select and back between two states and next and previous for in-state browsing.

5. A system as defined in claim 2 wherein said meta-data browsing codes include select and back between two states and next and previous for in-state browsing.

6. A system as defined in claim 1 wherein said meta-data in-state browsing codes include select and back between two states and next and previous for in-state browsing.

7. A system as defined in claim 1 wherein said playback codes include, play, stop, pause, fast forward, fast reverse, previous and next commands.

8. A system as defined in claim 1 wherein said communication channel is supported by a Universal Asynchronous Receiver Transmitter at both the audio system and the personal digital audio device.

9. A system for integrating a personal digital audio device to a vehicular audio system having its own display and control buttons; said personal digital audio device and said vehicular audio system connected together through a communication channel without an interface unit therebetween; said personal digital audio device and said vehicular audio system having an audio channel connected therebetween; said system comprising:

said personal digital audio device sending a series of information packets to said vehicular audio system including device identification, confirmation of supported baud rates, playback control code information and meta-data browsing code information; and said vehicular audio system sending a series of information packets to said personal digital audio device including, supported baud rates, playback control queries, meta-data browsing queries and a configuration notice; and said personal digital audio device and said vehicular audio system each reconfigure to provide communication to the other through the communication channel.

10. A system as defined in claim 9 wherein said playback control information includes play, stop, pause, fast forward, fast reverse, previous and next commands.

11. A system as defined in claim 10 wherein said meta-data browsing code information includes select and back between two states and next and previous for in-state browsing.

12. A system as defined in claim 9 wherein said meta-data browsing code information includes select and back between two states and next and previous for in-state browsing.

13. A system as defined in claim 9 wherein said communication channel is supported by a Universal Asynchronous Receiver Transmitter at both the audio system and the personal digital audio device.

* * * * *